United States Patent
Ishimaru et al.

[11] Patent Number: 6,167,203
[45] Date of Patent: Dec. 26, 2000

[54] CAMERA WITH THE FUNCTION OF CHANGING THE TRANSMITTANCE OF LIQUID-CRYSTAL DISPLAY SECTION TO LET USER KNOW PHOTOGRAPH ENABLE MODE

[75] Inventors: Toshiaki Ishimaru, Hino; Hiroshi Yamada, Hachioji, both of Japan

[73] Assignee: Olympus Optical Co., Ltd., Tokyo, Japan

[21] Appl. No.: 09/294,871

[22] Filed: Apr. 20, 1999

[30] Foreign Application Priority Data

Apr. 24, 1998 [JP] Japan .................................. 10-115488

[51] Int. Cl.[7] .................................................. G03B 17/20
[52] U.S. Cl. .......................... 396/284; 396/287; 396/296
[58] Field of Search ...................... 396/281, 287, 396/288, 289, 290, 291, 292, 296, 378, 380, 435, 436, 349, 284, 408, 407, 302

[56] References Cited

U.S. PATENT DOCUMENTS

| | | | |
|---|---|---|---|
| 4,372,657 | 2/1983 | Iwata et al. | 396/287 |
| 4,697,900 | 10/1987 | Eguchi et al. | 396/284 |
| 4,804,992 | 2/1989 | Moriyama et al. | 396/287 |
| 5,603,068 | 2/1997 | Aihara | 396/287 |
| 5,708,882 | 1/1998 | Yokonuma et al. | 396/302 |
| 5,740,482 | 4/1998 | Inazuka | 396/287 |

FOREIGN PATENT DOCUMENTS

5-165017  6/1993  Japan .

*Primary Examiner*—W. B. Perkey
*Attorney, Agent, or Firm*—Frishauf, Holtz, Goodman, Langer & Chick, P.C

[57] ABSTRACT

A camera comprises a liquid-crystal display device and a liquid-crystal control section. The liquid-crystal display device has a liquid crystal whose transmittance is variable. The liquid-crystal control section, in the photograph enable mode, brings the liquid crystal of the liquid-crystal display device into the light-transmitting state and, in the photograph disable mode, brings the liquid crystal of the liquid-crystal display device into a half light-transmitting state or the no-light-transmitting state.

5 Claims, 13 Drawing Sheets

CAMERA WITH THE FUNCTION OF CHANGING THE TRANSMITTANCE OF LIQUID-CRYSTAL DISPLAY SECTION TO LET USER KNOW PHOTOGRAPH ENABLE MODE

BACKGROUND OF THE INVENTION

This invention relates to a camera with a liquid-crystal display device (hereinafter, referred to as an LCD) in its finder.

Use of liquid crystal for a display in the finder of a camera has been proposed. With such an LCD, the AF target mark, various modes, and the selection of field angle, such as panorama or normal, are represented on the LCD screen. Positive LCDs, including guest-host LCDs and TN (twisted nematic) LCDs, have been widely used.

Recently, the use of macromolecular dispersion liquid crystal for an LCD in the finder of a camera has been proposed, as disclosed Jpn. Pat. Appln. KOKAI Publication No. 5-165017. The macromolecular dispersion liquid crystal disclosed in the publication is a positive liquid crystal, which prevents light from passing through when a voltage is applied and allows light to pass through when no voltage is applied. On the other hand, negative liquid crystals have also been known. They allow light to pass through when a voltage is applied and prevent light from passing through when no voltage is applied.

Since such a macromolecular dispersion liquid crystal display has a high degree of scattering, use of it for the finder of a camera makes the amount of light reaching the pupil very small. This enables a finder with a high contrast to be constructed, as compared with the TN LCD or guest-host LCD type. Conventional TN LCDs are available in the negative and positive types. The types of liquid crystals usable for the finder of a camera have been increasing in number these days.

With a camera having an LCD in its finder, however, because there is no change in the transmittance of the liquid crystal, regardless of whether the camera is in the photograph enable mode or in the photograph disable mode, the following drawbacks arise.

Firstly, in the case of a camera with a barrier, when the barrier is opened, the visual field changes from pitch-black to bright. As a result, the user can know that the barrier has been opened but cannot know whether the power switch has been turned on.

Secondly, in the case of a camera without a barrier, even when the power switch is turned on, the display in the finder does not change. As a result, the user cannot know clearly whether the camera is in the photograph enable mode.

BRIEF SUMMARY OF THE INVENTION

The object of the present invention is to provide a camera which enables the user to judge properly whether the camera is in the photograph enable mode or in the photograph disable mode, just by looking at the liquid-crystal display device.

The foregoing object is accomplished by providing a camera according to a first aspect of the present invention, comprising: a liquid-crystal display device with a liquid crystal whose transmittance is variable; and a liquid-crystal control section which, in a photograph enable mode, brings the liquid crystal of the liquid-crystal display device into a light-transmitting state and, in a photograph disable mode, brings the liquid crystal of the liquid-crystal display device into a half light-transmitting state or a no-light-transmitting state.

According to a second aspect of the present invention, there is provided a camera comprising: a liquid-crystal display device which is provided in a finder and includes a liquid crystal whose transmittance is variable; a power switch for switching between a photograph enable mode and a photograph disable mode; and a liquid-crystal control section which, when the photograph enable mode is selected by the power switch, brings the liquid crystal of the liquid-crystal display device into a light-transmitting state and, when a photograph disable mode is selected by the power switch, brings the liquid crystal of the liquid-crystal display device into a half light-transmitting state or a no-light-transmitting state.

According to a third aspect of the present invention, there is provided a camera comprising: a liquid-crystal display device which is provided in a finder and includes a liquid crystal which can be set to a first, a second, or a third transmittance in descending order of magnitude; a power switch for switching between a photograph enable mode and a photograph disable mode; and a liquid-crystal control section which, when the photograph enable mode is selected by the power switch, sets the liquid crystal of the liquid-crystal display device to the first transmittance, and, when the photograph disable mode is selected by the power switch, sets the liquid crystal of the liquid-crystal display device to the third transmittance, and, when the photograph enable mode is selected by the power switch and exposure is made, sets the liquid crystal of the liquid-crystal display device to the second transmittance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9A shows a segment pattern, FIG. 9B a common pattern, FIG. 9C a normal finder display, FIG. 9D a panorama display, and FIG. 9E a blackout display;

DETAILED DESCRIPTION OF THE INVENTION

Figure 1:
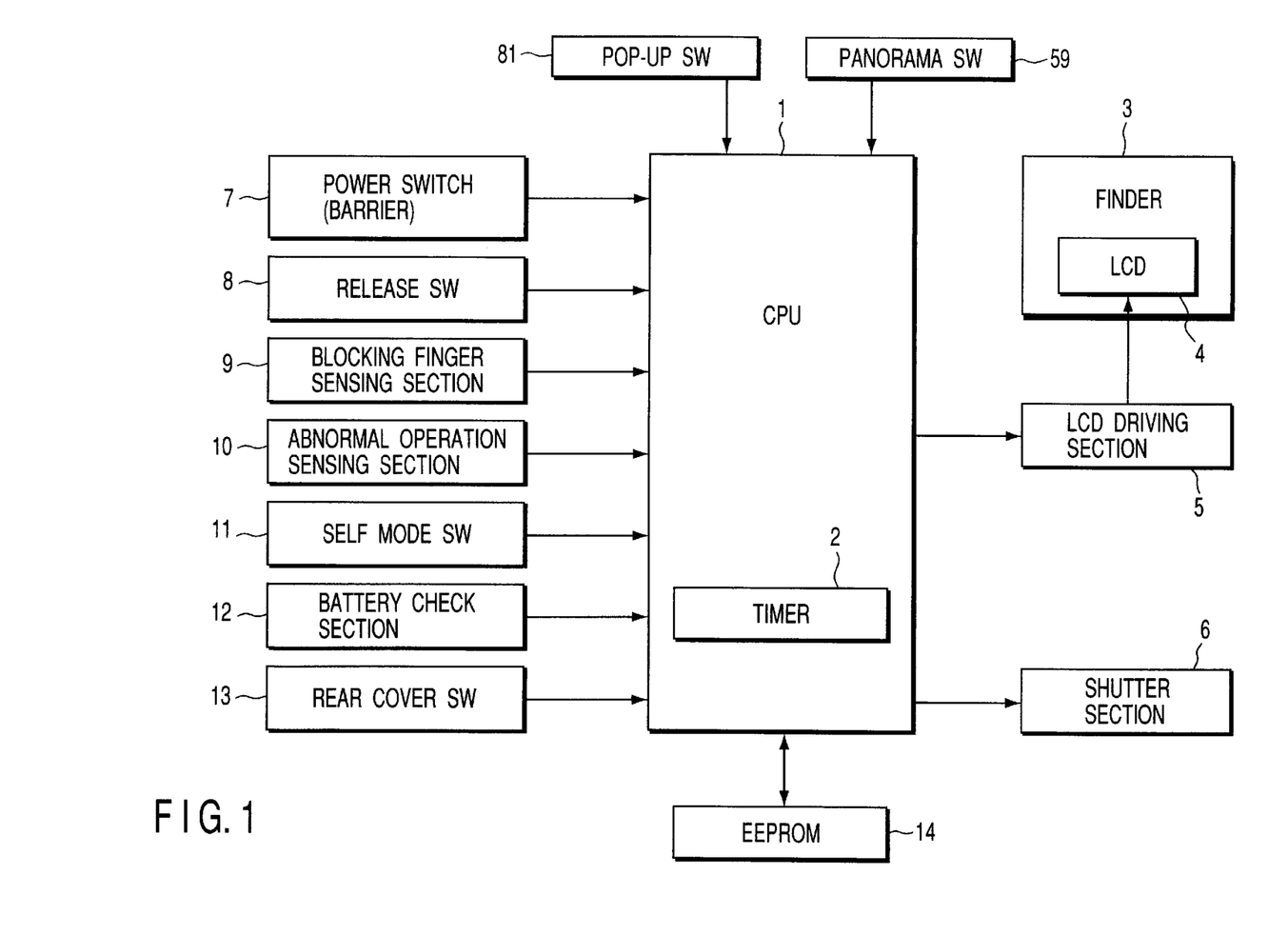
FIG. 1 is a conceptual diagram of a camera according to an embodiment of the present invention.

Hereinafter, referring to the accompanying drawings, an embodiment of the present invention will be explained in detail. FIG. 1 is a conceptual diagram of a camera according to an embodiment of the present invention. In FIG. 1, a CPU 1 is used to control various operations of the camera. It includes a timer 2. Connected to the CPU 1 are a power switch (barrier switch) 7 as a switch section, a release switch (release SW) 8, a blocking finger sensing section 9, an abnormal operation sensing section 10, a self-mode switch (self-mode SW) 11, a battery check section 12, a rear cover switch (rear cover SW) 13, a shutter section 6, a pop-up switch (pop-up SW) 81, an EEPROM 14, and a panorama switch (panorama SW) 59. A finder 3 is also connected to the CPU 1 via an LCD driving section 5. An LCD (hereinafter, referred to as an in-F LCD) 4 is provided in the finder 3.

The embodiment is characterized in that the display is blacked out (or the in-F LCD 4 is caused to prevent light from passing through) to give various representations or alarm messages by changing the transmittance of the in-F LCD 4 under the control of the CPU 1 on the basis of various inputs from the user and the result of sensing, for example a blocking finger. For instance, they are as follows:

1) The in-F LCD 4 is changed from blackout to light-transmitting in synchronization with the turning on of the power switch 7. When the power switch has been turned on or a specific time has elapsed, the in-F LCD 4 is returned to blackout display. This enables the user to judge whether the camera is in the photograph enable mode or the photograph disable mode, just by viewing the in-F LCD 4.

2) When exposure is made, the display of the in-F LCD 4 is blacked out. This enables the user to know that exposure has been made, just by viewing the in-F LCD 4.

3) When the blocking finger sensing section 9 has sensed that a finger covering the distance-measuring section, photometric section, or strobe section prevents proper distance measurement, photometry, or strobe operation, the display of the in-F LCD 4 is blacked out. In addition, when the pop-up switch 81 has sensed that the user has pressed the strobe section, the in-F LCD 4 is also blacked out. On the basis of the blackouts, the user can know not only that a finger has covered the camera but also that the strobe section has been pressed, just by viewing the in-F LCD 4.

4) When the user operates the self-mode switch 11 and brings the camera into the self mode, the display of the in-F LCD 4 is blacked out. This enables the user to know that the camera is not in the normal exposure state, just by viewing the in-F LCD 4.

5) The battery check section 12 senses the battery voltage. If the battery voltage is lower than a specific voltage, the display of the in-F LCD 4 will be blacked out. This enables the user to know that the power supply is running out, just by viewing the in-F LCD 4.

6) The liquid-crystal display is blacked out by lowering the transmittance of the in-F LCD 4 temporarily in synchronization with the release switch 8. In this case, the time during which the transmittance is lowered temporarily is measured by the timer 2 and controlled so that it is longer than the shutter open time in exposure. This enables the user to judge whether a picture has been taken.

7) When the abnormal operation sensing section 10 has sensed an abnormal operation of the camera and the proper operation of the camera cannot be guaranteed, not only is the release switch 8 prevented from being pressed but also the in-F LCD 4 is blacked out. This enables the user to know that the camera is abnormal, just by viewing the in-F LCD 4.

8) When various operations of the camera are being carried out, for instance, when the autoload operation is being carried out with the rear cover switch 13 being closed, not only is the release switch prevented from being pressed but also the in-F LCD 4 is blacked out. This enables the user to know that exposure cannot be made, just by viewing the in-F LCD 4. When the user operates a panorama switch 59, explained later, the screen size is changed. Then, the changed screen is caused to allow light to pass through and the remaining portion is forced to prevent light from passing through. This enables the user to know that the panorama display is in operation, just by viewing the in-F LCD 4.

Figure 2A:
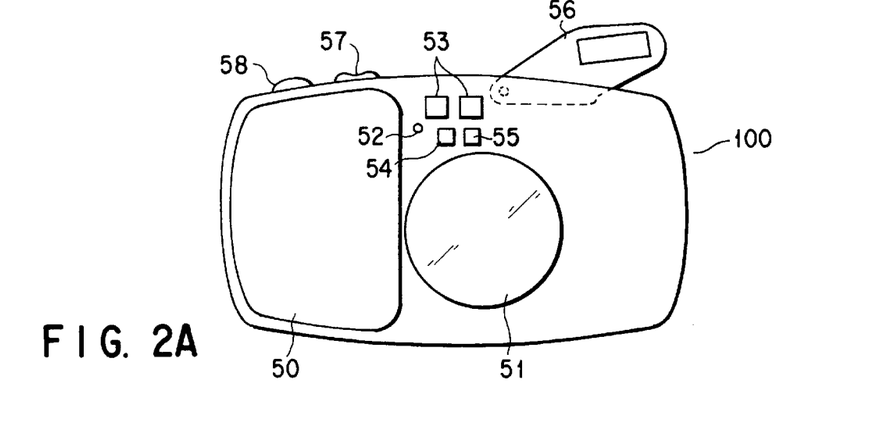
FIG. 2A is a front view of the camera 100 according to the embodiment and FIG. 2B is a top view of the camera 100.
Figure 2B:
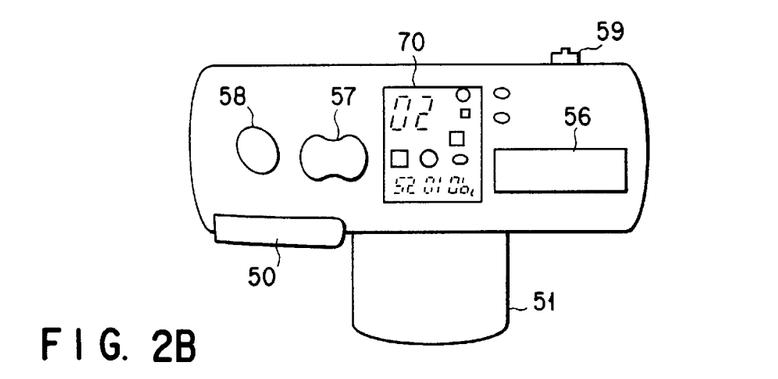

FIG. 2A is a front view of the camera 100 and FIG. 2B is a top view of the camera 100. An AF window 53, a finder 54, a photometric window 55, and a self LED 52 are provided at the top middle of the front of the camera. Below them, there is provided a lens tube 51. The lens tube 51 houses a camera optical system and is capable of moving in and out. On the right side of the front, a barrier 50 is provided. An external liquid-crystal display section 70 is provided in the middle of the top face of the camera and can display the date, various camera modes, and frame number. When the camera is viewed from the front, a release SW 58 and a zoom SW 57 are provided on the left side of the top face and a pop-up section 56 incorporating a strobe flashing section is provided on the right side of the top face. In addition, at the back of the camera, there is provided a slidable panorama SW 59.

Figure 3:
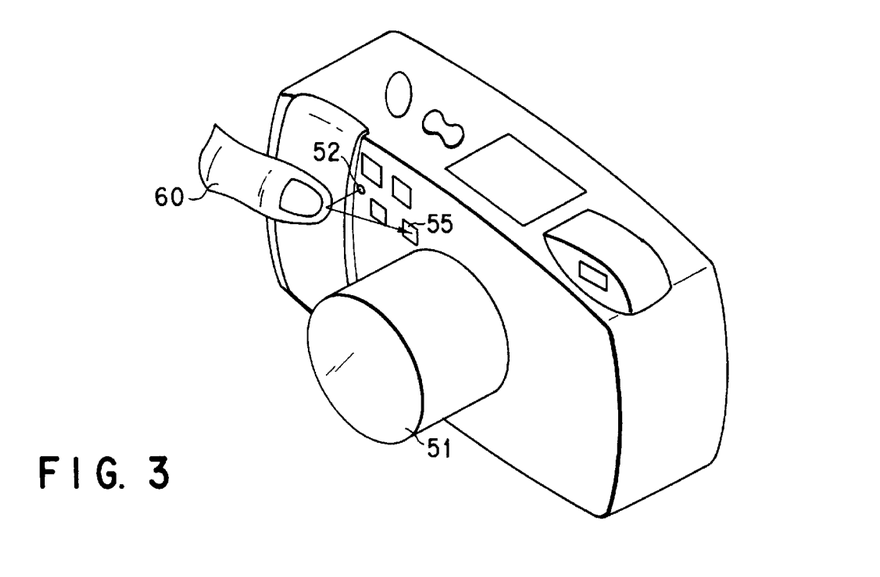
FIG. 3 shows a state where the user blocks the light from a self LED 52 with a finger.
Figure 4A:
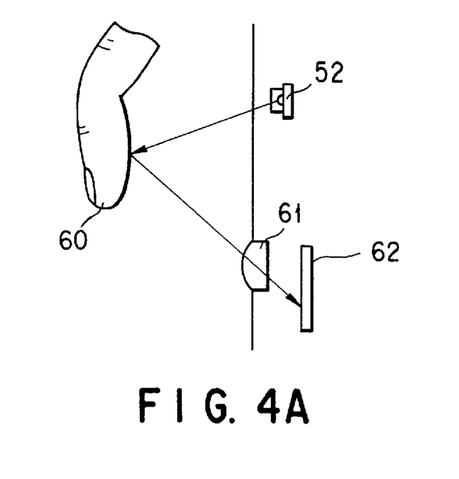
FIGS. 4A and 4B show a state where the light blocked by a finger is sensed by a photometric sensor.
Figure 4B:
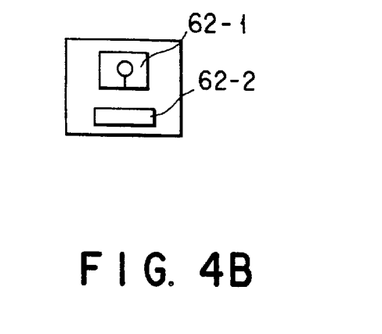

Hereinafter, the operation of sensing a finger blocking the light at the blocking finger sensing section 9 will be explained in detail. FIG. 3 is a perspective view of the camera illustrating a state where the user has blocked the light from the self LED 52 with a finger. The light blocked by a finger enters at the photometric window 55. The light passing through the photometric window 55 is gathered by a condenser lens 61 and sensed by a photometric sensor 62 as shown in FIG. 4A. The photometric sensor 62 is composed of a photometric section 62-1 and a blocking finger sensing light-receiving section 62-2. The photometric section 62-1 performs normal photometry. An infrared LED may be used in place of the self LED 52.

Figure 5A:
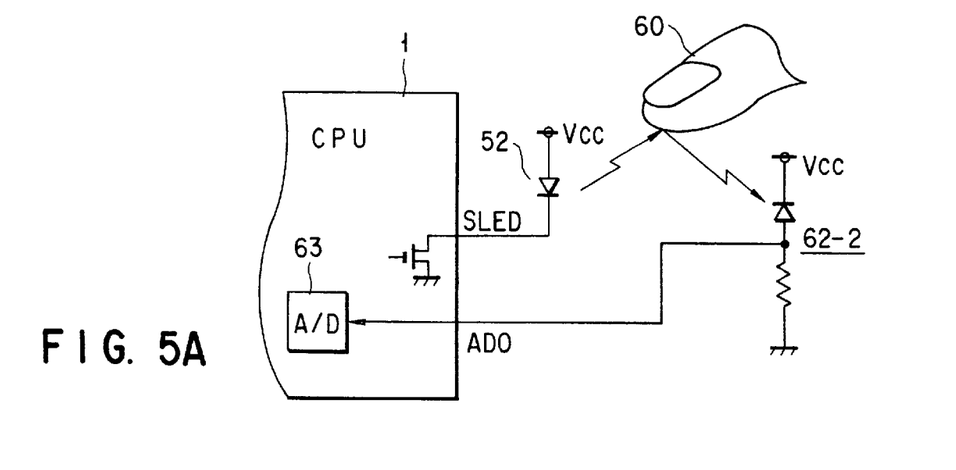
FIG. 5A is a circuit diagram of a blocking finger sensing section 9.
Figure 5B:
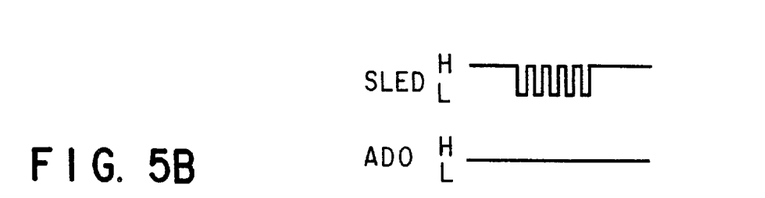
FIG. 5B shows a waveform of a signal for driving the self LED.
Figure 5C:
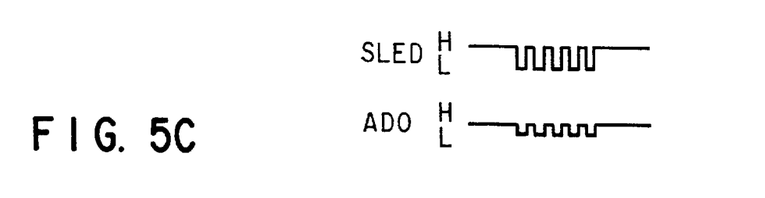
FIG. 5C shows a waveform of the sensed signal.

FIG. 5A shows a circuit configuration of the blocking finger sensing section 9. A signal $S_{LED}$ from the CPU 1 causes the self LED 52 to emit light. FIG. 5B shows a waveform of the signal $S_{LED}$. When the light has not been blocked by a finger, no light enters the blocking finger sensing light-receiving section 62-2. As a result, the waveform of the signal AD0 inputted from the light-receiving section 62-2 to an A/D converter 63 of the CPU 1 is as shown in FIG. 5B. In contrast, when the light has been blocked by a finger, the light from the self LED 52 blocked by a finger 60 enters the blocking finger sensing light-receiving section 62-2. As a result, the waveform of the signal AD0 inputted to the A/D converter 63 of the CPU 1 is as shown in FIG. 5C. In this way, the state where a finger has blocked the light is sensed.

Figure 6:
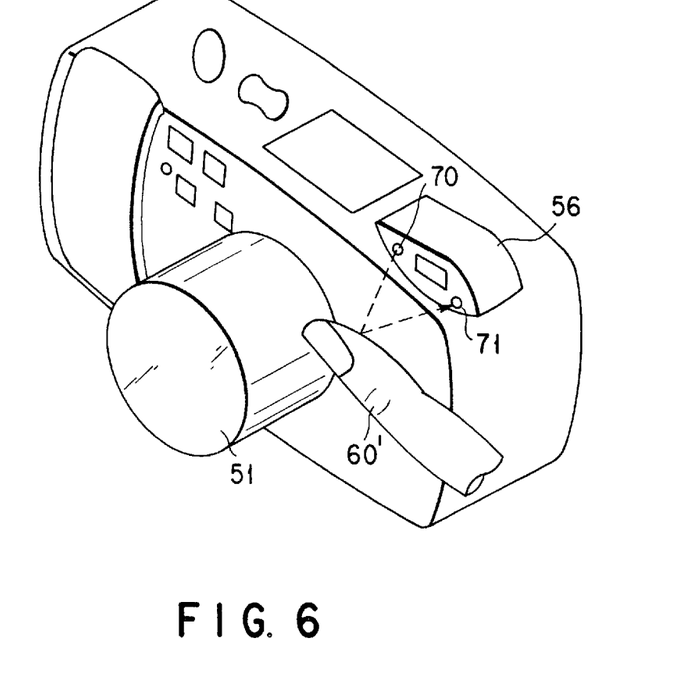
FIG. 6 is a perspective view to help explain a modification of the blocking finger sensing.

FIG. 6 is a perspective view of the camera to help explain a modification of the process of sensing that a finger has blocked the light. To sense a finger blocking the light, an infrared LED 70 and a light-receiving section 71 are provided in the pop-up section 56. When a finger 60' of the user has blocked the light from the infrared LED 70, the light strikes the light-receiving section 71, which then senses it. The detail of sensing is the same as when the light from the self LED 52 has been blocked in the embodiment. Thus, further explanation will not be given here.

Figure 7:
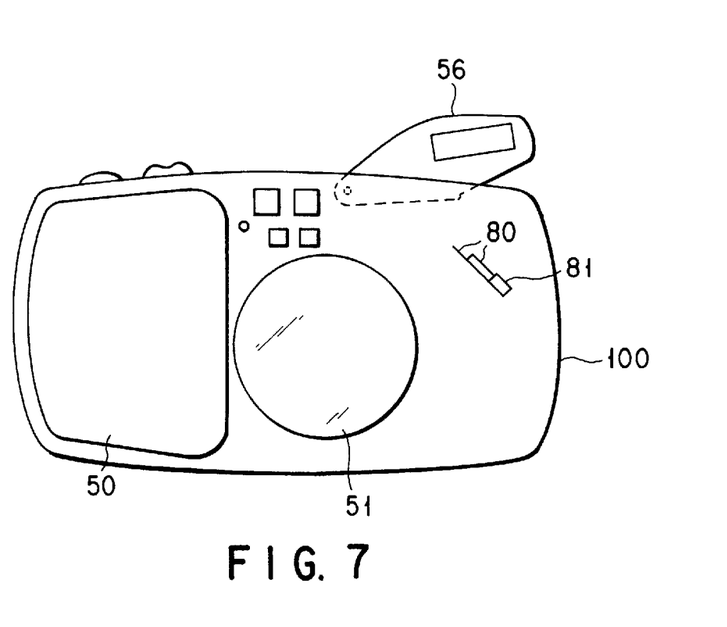
FIG. 7 is a front view to help explain a method of sensing that the user has pressed the pop-up section 56 during the flashing of the strobe.

FIG. 7 is a front view of the camera to help explain a method of sensing a state where the user has pressed the pop-up section 56 during the flashing of the strobe. As shown in FIG. 7, the pop-up SW 81 and a metal strip 80 are provided at the front of the camera 100. When the user presses the pop-up section 56, the pop-up SW 81 turns off. When the pop-up section 56 is in the up position, the pop-up SW 81 is on. Therefore, sensing the state of the pop-up SW 81 makes it possible to sense a state where the pop-up section has been pressed.

Figure 8A:
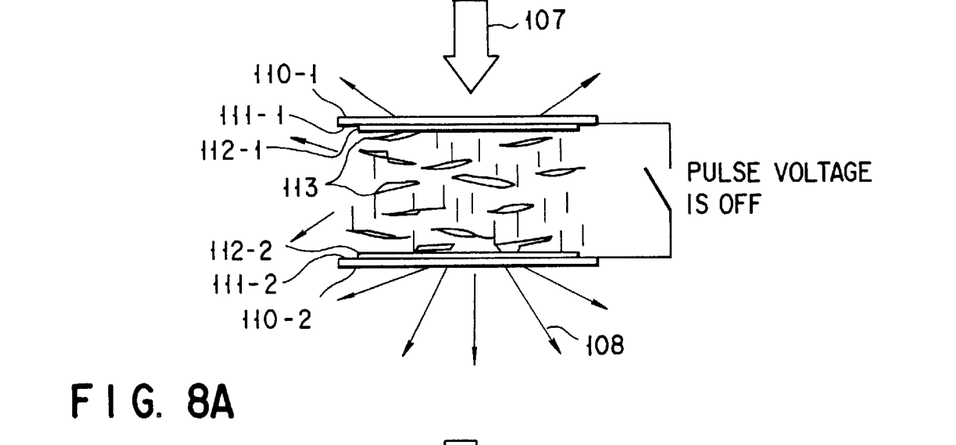
FIGS. 8A, 8B, and 8C show the structure of a negative macromolecular dispersion LCD used in the embodiment.
Figure 8B:
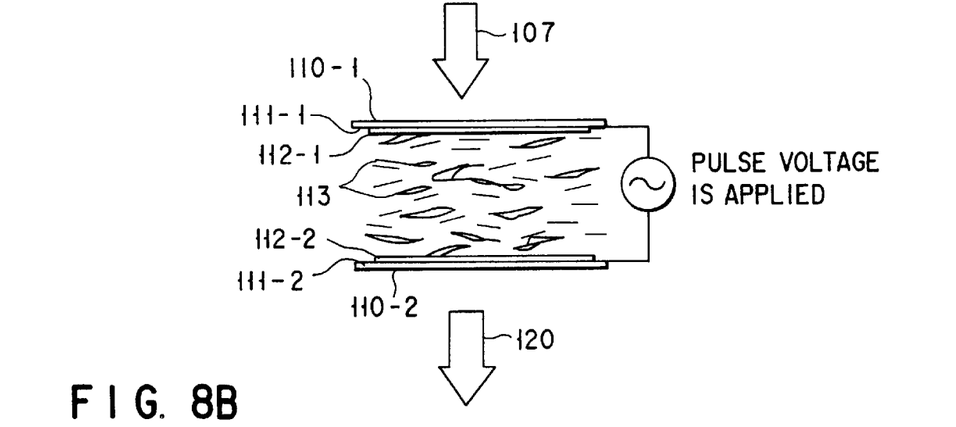
Figure 8C:
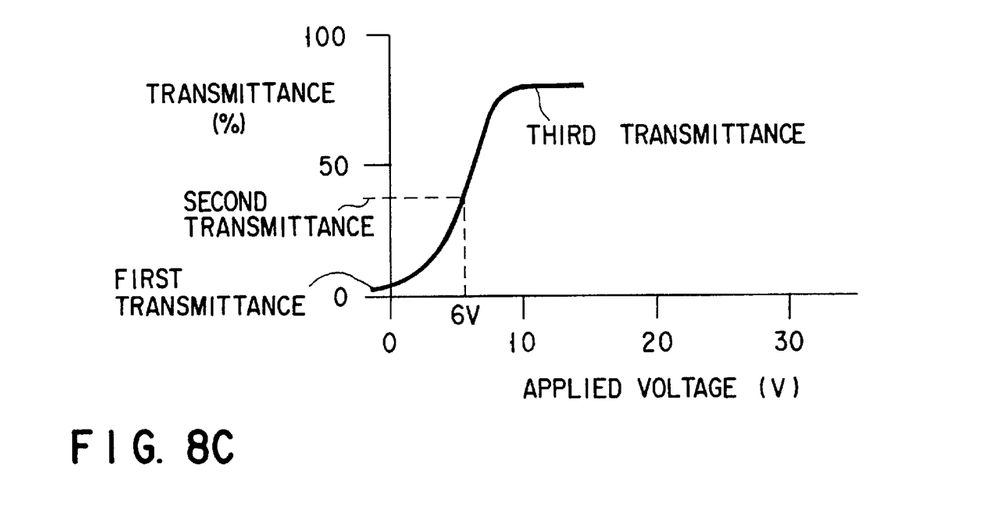

FIGS. 8A, 8B, and 8C show a configuration of a negative macromolecular dispersion LCD used in the embodiment. As shown in FIGS. 8A, 8B, and 8C, a pair of alignment films 112-1, 112-2, a pair of electrodes 111-1, 111-2, and a pair of glass substrates 110-1, 110-2 are provided in that order, with macromolecular particles 113 between them. FIG. 8A shows the no-light-transmitting state where no pulse voltage is applied. In this state, the incident light 107 is outputted in the form of scattered light 108. FIG. 8B shows the light-transmitting state where a pulse voltage is applied. In the state, the incident light 107 is outputted in the form of emitted light 120.

FIG. 8C shows the relationship between the driving pulse voltage of the LCD and the transmittance. As shown in FIG. 8C, as the applied voltage increases, the transmittance increases. In the embodiment, the no-light-transmitting state with a first transmittance, the light-transmitting state with a third transmittance, and a second transmittance between the first and third transmittances are used.

While in the embodiment, the negative LCD has been used, a positive macromolecular dispersion LCD may be used, as disclosed in, for example, Jpn. Pat. Appln. KOKAI Publication No. 5-165017.

Figure 9A:
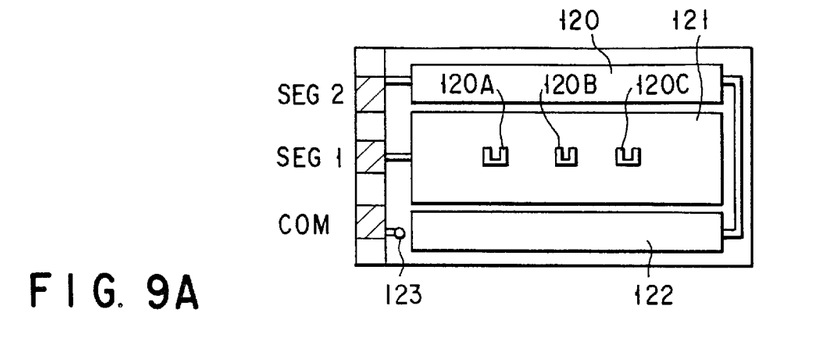
Figure 9B:
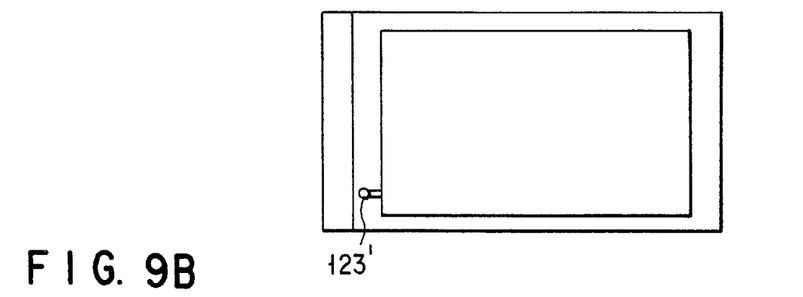

FIG. 9A shows a segment pattern on the lower glass substrate 110-2. The segment pattern is made up of a pattern 121 related to a SEG 1 electrode, a pattern 120 related to a SEG 2 electrode, and a pattern 122 related to a COM electrode. Three openings 120A, 120B, and 120C are made in the pattern 121. Numeral 123 indicates a connecting section. FIG. 9B shows a common pattern on the upper glass substrate 110-1. The common pattern has a connecting section 123' connected to the connecting section 123.

Figure 9C:
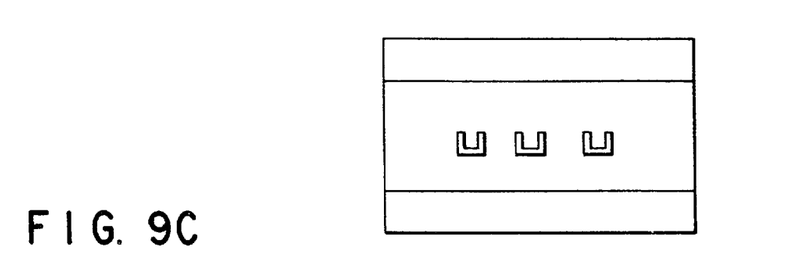
Figure 9D:
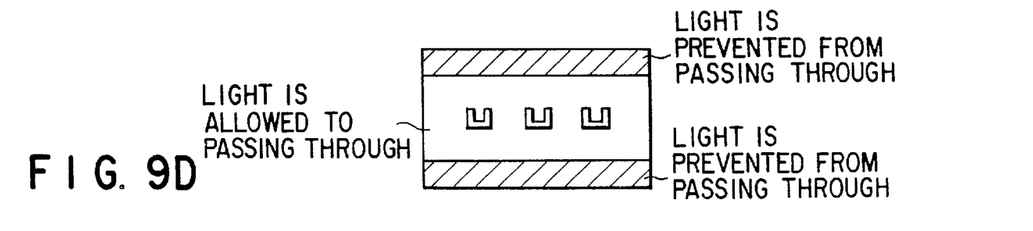
Figure 9E:
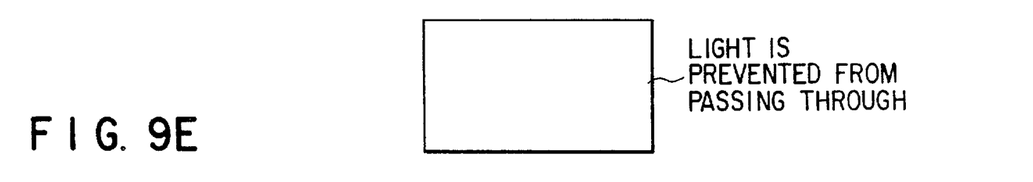

FIG. 9C illustrates a normal finder display, in which the three segment patterns and openings in FIG. 9A are shown. FIG. 9D illustrates a panorama display, which shows the state where the patterns 120 and 122 are caused to prevent light from passing through (or to block light) and the pattern 121 is forced to allow light to pass through. FIG. 9E illustrate a blackout display, in which all the patterns are caused to prevent light from passing through and go black.

Figure 10:
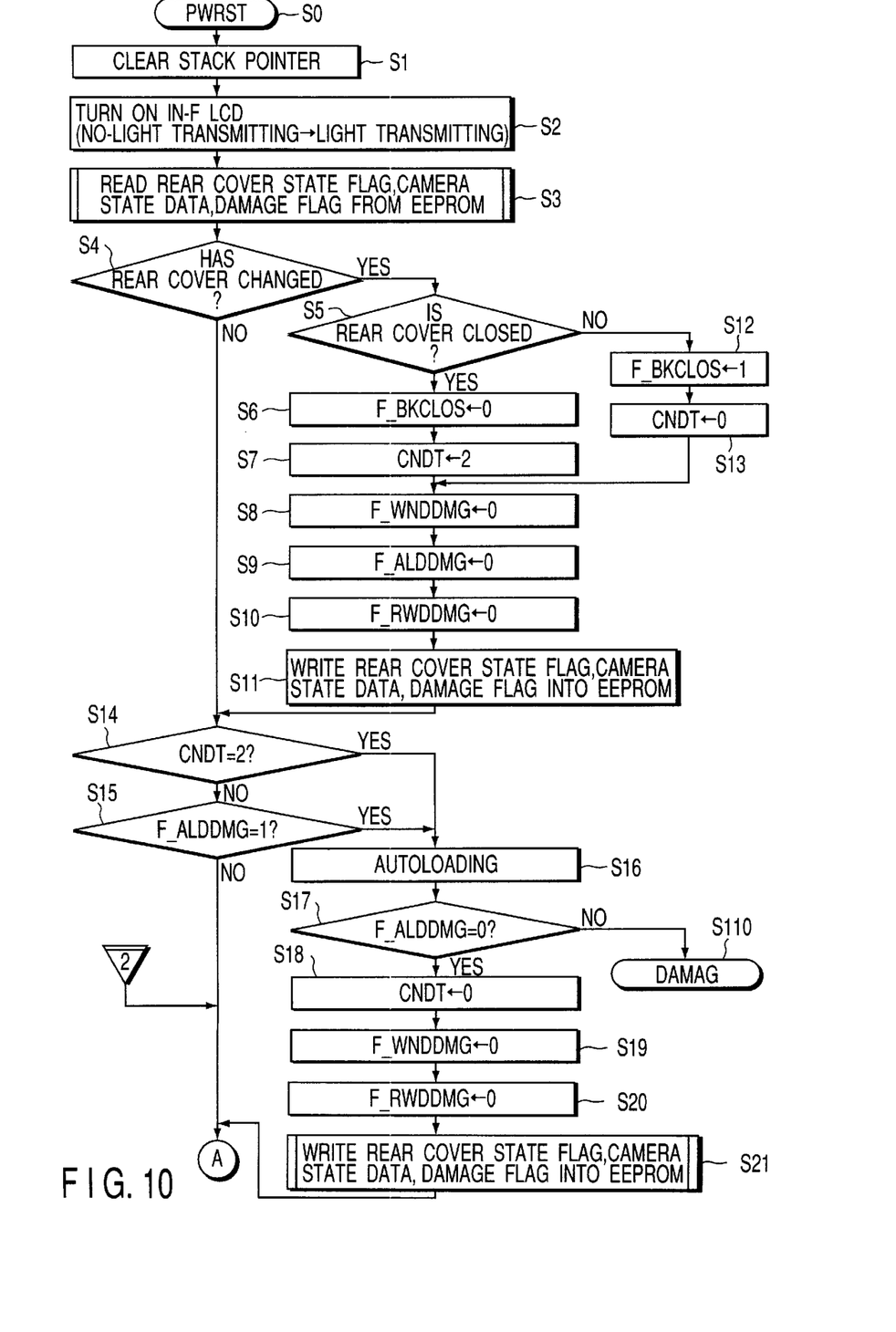
FIG. 10 is a flowchart to help explain part of the main flow of the camera.

Hereinafter, the main flow of the camera will be described in detail by reference to FIG. 10. The change of the barrier or rear cover gives rise to an interrupt, which starts a process at step S0 (PWRST). The stack pointer is cleared (step S1) and then the in-F LCD 4 is turned on to change from the no-light-transmitting state to the light-transmitting state (step S2). Next, a rear cover state flag F_BKCLOS, camera state data CNDT, and a damage flag are read from the EEPROM 14 (step S3). When the rear cover state flag F_BKCLOS has a value of 0, this means that the rear cover is closed, whereas when it has a value of 1, this means that the rear cover is open. For the camera state data CNDT, 0 means the normal state (or release enable), 1 means one-frame winding, 2 means autoloading, and 3 means rewinding. The damage flag includes three types of flag: F_WNDDMG meaning a failure in one-frame winding, F_ALDDMG meaning a failure in autoloading, and F_RWDDMG meaning a failure in rewinding.

Next, from the state of the rear cover state flag F_BKCLOS, it is judged whether the rear cover has been changed (step S4). If it has (YES), it will be judged whether the rear cover has been closed (step S5). If it has (YES), "0" will be substituted into the rear cover state flag F_BKCLOS (step S6) and "2" be substituted into the camera state data CNDT (step S7) and control will proceed to step S8.

If the rear cover has not been closed (NO) at step S5, "1" will be substituted into the rear cover state flag F_BKCLOS (step S12) and "0" be substituted into the camera state data CNDT (step S13). Then, control will proceed to step S8.

At step S8, the damage flag F_WNDDMG is cleared. At step S9, the damage flag F_ALDDMG is cleared. At step S10, the damage flag F_RWDDMG is cleared. Next, control goes to step S11, where the rear cover state flag F_BKCLOS, camera state data CNDT, and damage flag are written into the EEPROM 14.

After step 11 has been executed or when the result at step S4 is NO, control proceeds to step S14. At step S14, a check is made to see if the camera state data CNDT has a value of 2 (in the course of autoloading). If it has (YES), control will proceed to step S16, where autoloading will be effected. Depending on whether the autoloading has been done successfully, the damage flag F_RWDDMG is set at step S16. Next, a check is made to see if the damage flag F_ALDDMG has a value of 0 (step S17). If it has not (NO), control will go to step S110, where an abnormality handling process (DAMAG) will be executed, which will explained later. If it has (YES) at step S17, "0" will be substituted into the camera state data CNDT (step S18) to enable a release action. Thereafter, the damage flag F_WNDDMG will be cleared (step S19) and then the damage flag F_RWDDMG be cleared (step S20). Next, control will proceed to step S21, where the rear cover state flag F_BKCLOS, camera state data CNDT, and damage flag will be written into the EEPROM 14.

If the camera state data CND has not a value of 2 (NO) at step S14, control will go to step S15, where it is judged whether the damage flag F_ALDDMG has a value of 1. If it has (YES), this means a failure in the autoloading and therefore control will go to step S16 to execute the above-described steps to effect autoloading again.

Figure 11:
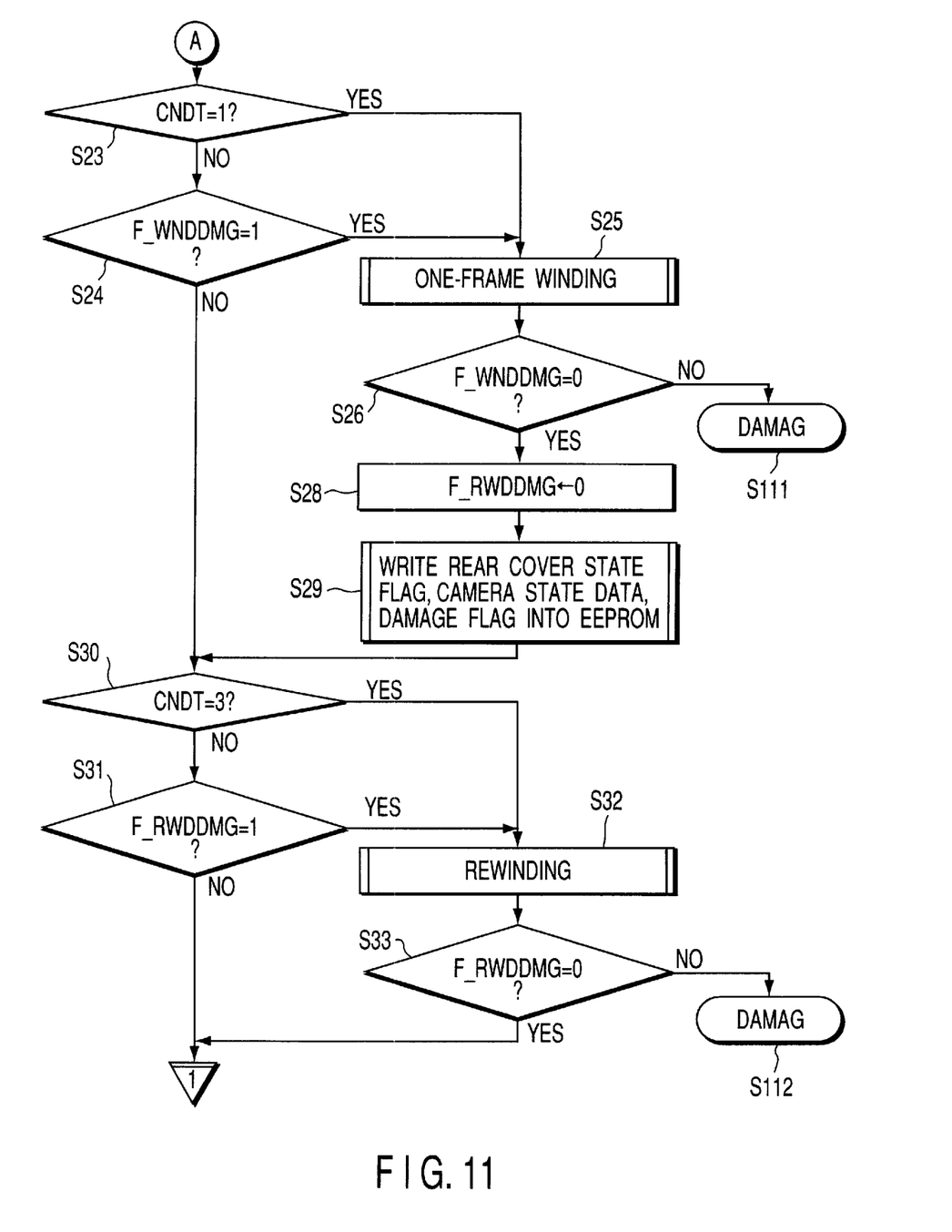
FIG. 11 is a flowchart to help explain another part of the main flow of the camera.

After step S21 has been executed or when the damage flag F_ALDDMG has not a value of 1 (NO) at step S15, control goes to step S23 in FIG. 11. At step S23, it is judged whether the camera state data CNDT has a value of 1. If it has (YES), control will proceed to step S25. If it has not (NO) at step S23, control will proceed to S24, where a check will be made to see if the damage flag F_WNDDMG has a value of 1. If it has not (NO), control will proceed to step S25.

At step S25, one-frame winding is done. Depending on whether one-frame winding has been done successfully, the damage flag F_WNDDMG is set at step S25. Next, it is judged whether damage flag F_WNDDMG has a value of 0 (step S26). If it has not (NO), control will proceed to step S111, where an abnormality handling process (DAMAG) will be executed, which will be explained later. If it has (YES), the damage flag F_RWDDMG will be cleared (step S28).

Next, control goes to step S29, where the rear cover state flag F_BKCLOS, camera state data CNDT, and damage flag are written into the EEPROM 14.

After step S29 has been executed or when the damage flag F_WNDDMG has not a value of 1 (NO) at step S24, control goes to step S30, where a check is made to see if the camera state data CNDT has a value of 3. If it has (YES), control will proceed to step S32. If it has not (NO), it will be judged at step S31 whether the damage flag F_RWDDMG has a value of 1. If it has (YES), control will go to step S32. At step S32, rewinding is done and a check is made to see if the damage flag F_RWDDMG has a value of 0. If it has not (NO), this means a failure in rewinding and therefore control will proceed to step S112 to effect rewinding again, where an abnormality handling process (DAMAG) will be executed, which will be explained later.

Figure 12:
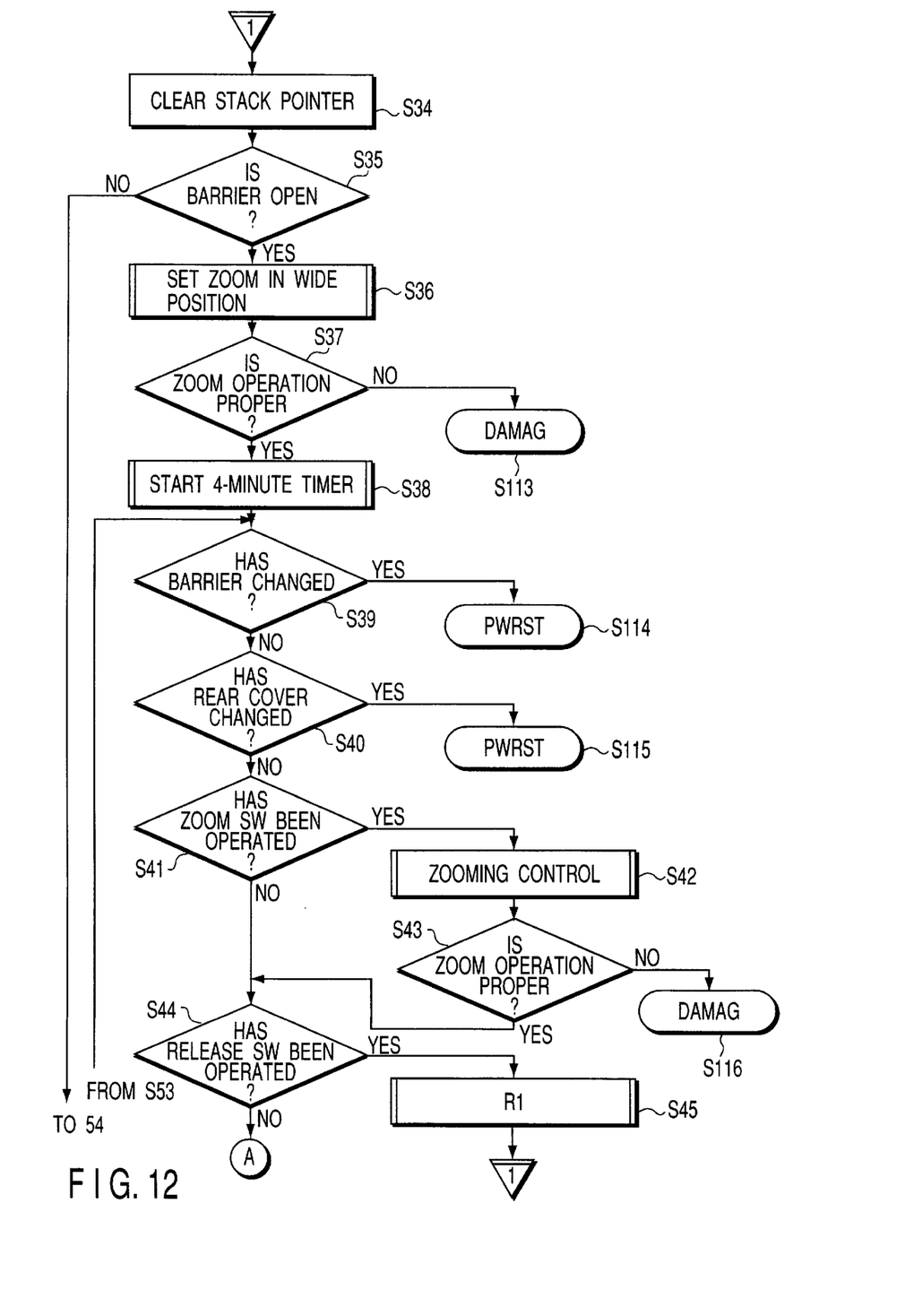
FIG. 12 is a flowchart to help explain another part of the main flow of the camera.
Figure 13:
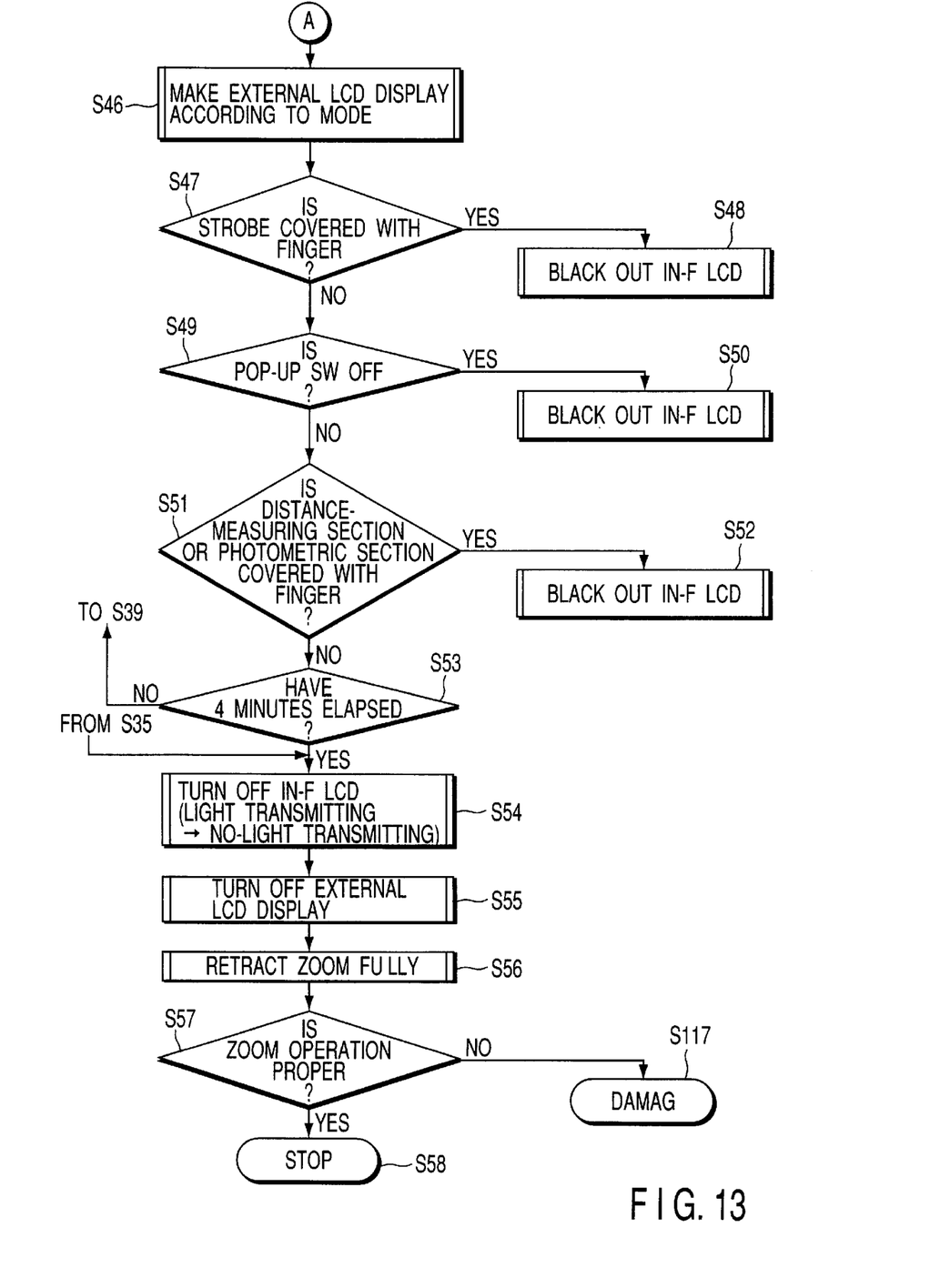
FIG. 13 is a flowchart to help explain still another part of the main flow of the camera.

When NO at step S31 or when YES at step S33, control goes to step S34 in FIG. 12, where the stack pointer is cleared. Then, at step S35, a check is made to see if the barrier is open. If it is not (NO), control will jump to step S54. If it is (YES), the zoom will be set to the wide position (step S36). Next, it is judged whether the zoom operation at step S36 has been proper (step S37). If it has not (NO), control will proceed to step S113, where an abnormality handling process (DAMAG) will be executed. If it is (YES), control will go to step S38, where a four-minute timer will be started.

Next, control goes to step S39, where a check is made to see if the barrier has changed. If it has (YES), control will proceed to step S114 (PWRST). If it has not (NO), control will go to step S40, where a check will be made to see if the rear cover has changed. If it has (YES), control will proceed to step S115 (PWRST). If it has not (NO), control will go to step S41, where it will be judged whether the zoom SW has been operated. If it has (YES), zooming control will be executed (step S42). Next, it is judged whether the zoom operation at step S42 has been proper (step S43). If it has not (NO), control will proceed to step S116, where an abnormality handling process (DMAG) will be executed.

When the rear cover has not been changed (NO) at step S41, or when the zoom operation has been proper (YES) at step 43, control goes to step S44, where a check is made to see if the release SW has been operated. If it has (YES), the release process (R1) will be carried out (step S45) and then control will jump to step S23 (FIG. 11). If the zoom operation has not been proper (NO) at step S44, control will go to step S46, where an external LCD display will be made according to the mode. Next, a check is made to see if the strobe has been covered with a finger (step S47). If it has (YES), the in-F LCD will be blacked out (step S48). The driving pulse voltage of the LCD may be lowered to provide a transmittance between transmission and non-transmission. Alternatively, transmission may alternate with non-transmission. To do this, a circuit for alternating between transmission and non-transmission is provided and turned on and off by software.

After step S48 has been executed or when the strobe has not been covered with a finger (NO) at step S47, control goes to step S49, where it is judged whether the pop-up section 56 has been pressed to turn off the pop-up SW. If it has (YES), the in-F LCD will be blacked out (step S50).

After step S50 has been executed or when the pop-up section 56 has not been pressed (NO) at step S49, control goes to step S51, where the distance-measuring section or the photometric section has been covered with a finger (step S51). If it has (YES), the in-F LCD will be blacked out (step S52).

After step S52 has been executed or when neither the distance-measuring section nor the photometric section has been covered with a finger (NO) at step S51, control proceeds to step S53, where a check is made to see if four minutes have elapsed. If they have not (NO), control will return to step S39. If they have (YES), the in-F LCD will be turned off to change from the light-transmitting state to the no-light-transmitting state (step S54). Next, control proceeds to step S55, where the external LCD is turned off and the zoom is retracted fully (step S56). Next, control goes to step S57, where it is judged whether the zoom operation is proper. If it is not (NO), control will proceed to step S117, where an abnormality process (DAMAG), explained later, will be carried out. If it is (YES), control will proceed to step S58, where the camera operation will be stopped.

Figure 14:
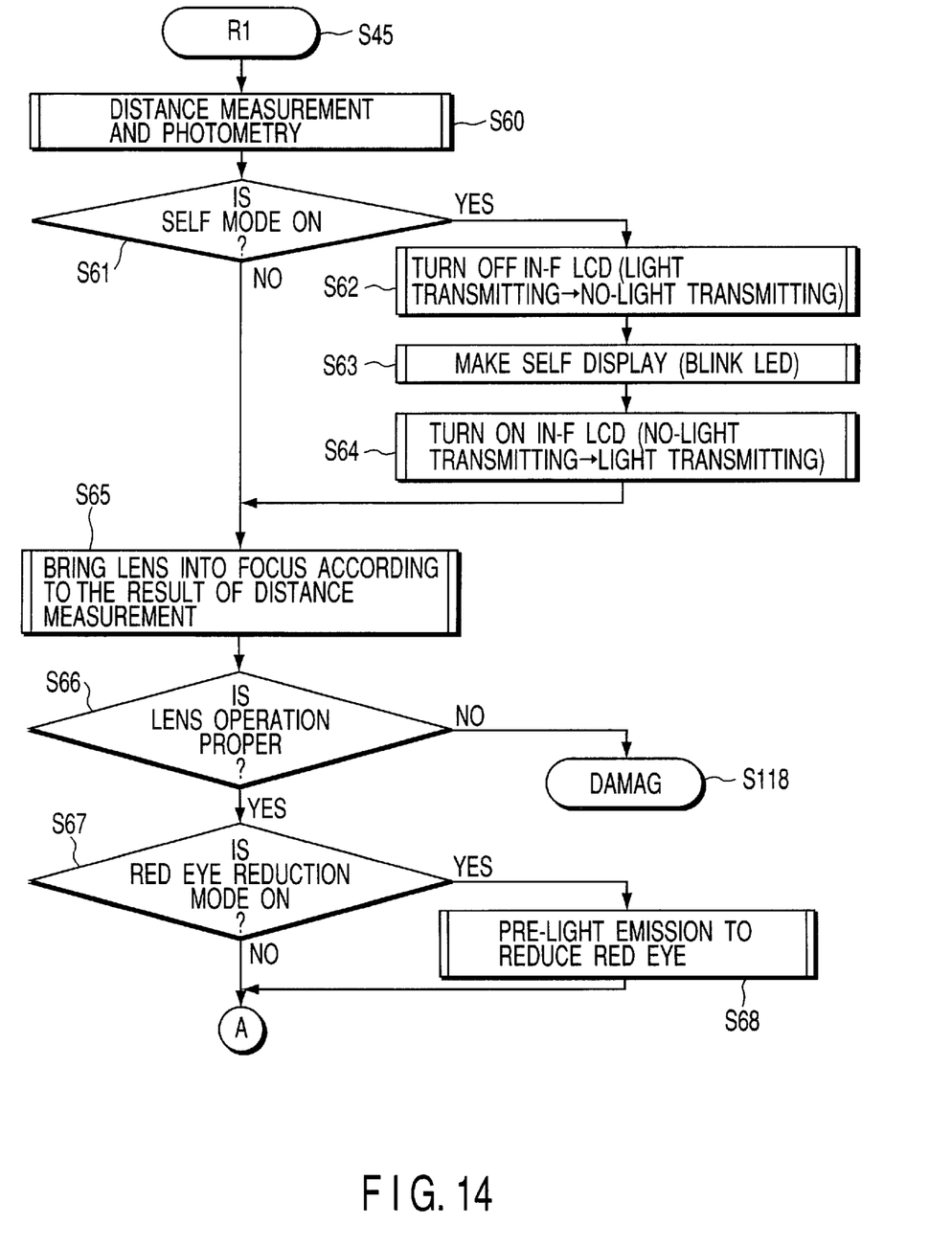
FIG. 14 is the first half of a flowchart to help explain the release process in detail.

Next, the release process (R1) will be described in detail by reference to the flowchart of FIG. 14. First, distance measuring and photometry are carried out (step S60). Then, it is judged whether the self mode is on (step S61). If it is (YES), the in-F LCD will be turned off to change from the light-transmitting state to the no-light-transmitting state (step S62). Next, the LCD is caused to blink to provide a self-display (step S63). Then, the in-F LCD is turned on to change from the no-light-transmitting state to the light-transmitting state (step S64).

After step S64 has been executed or when the self mode is not on (NO) at step S61, control goes to step S65, where the lens is brought into focus according to the result of distance measuring. Then, control goes to step S66, where it is judged whether the lens operation at step S65 has been proper. If it has not (NO), control will proceed to step S118, where an abnormality handling process (DAMAG) will be carried out. If it has (YES), control will proceed to step S67, where a check will be made to see if the red eye reduction mode is on. If it is (YES), pre-light emission will be carried out to reduce red eye (step S68).

Figure 15:
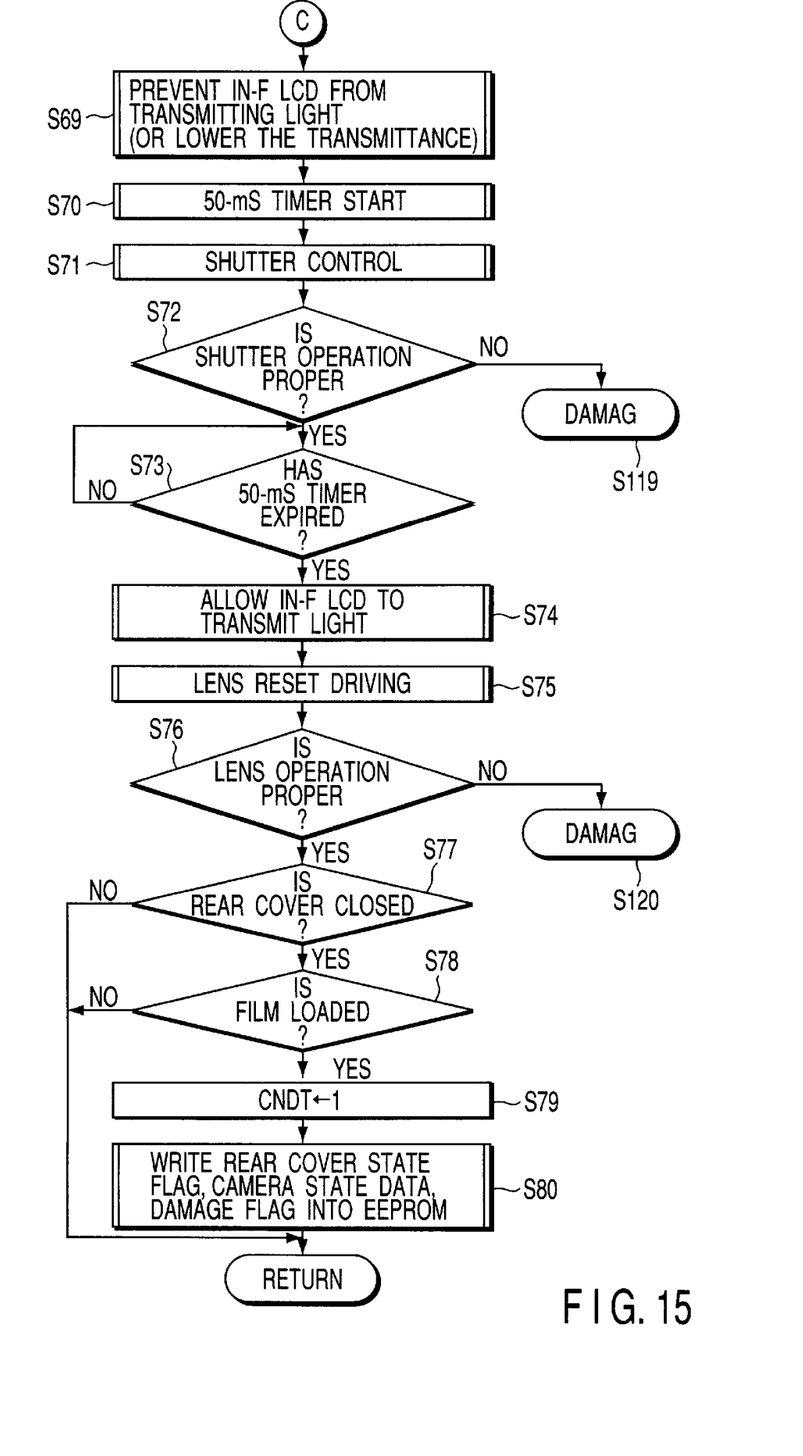
FIG. 15 is the second half of the flowchart to help explain the release process in detail.

After step S68 has been executed or when the red eye reduction mode is not on (NO) at step S67, control goes to step S69, where the in-F LCD is brought into the no-light-transmitting state. The transmittance of the in-F LCD may be lowered. After a 50-ms timer has been started at step S70, shutter control is carried out at step S71. Next, it is judged whether the shutter operation is proper (step S72). If it is not (NO), control will go to step S119, where an abnormality process (DAMAG) will be performed. If it is (YES), control will proceed to step S73, where a check will be made to see if the 50-ms timer has expired. If it has not (NO), control will wait for the timer to expire. Once the timer has expired, control will go to step S74, where the in-F LCD will be caused to allow light to pass through. Waiting for 50 ms at step S73 causes the display to be blacked out for at least 50 ms even when the shutter operates at high speed, which enables the user to know reliably that exposure has been made. Next, the lens is driven for resetting (step S75). Then, it is judged whether the lens operation at step S75 has been proper (step S76). If it has not (NO), control will proceed to step S120, where an abnormality handling process (DAMAG) will be carried out, which will be explained later. If it has (YES), it will be judged whether the rear cover is closed (step S77). If it is (YES), it will be judged whether film has been loaded (step S78). If it has (YES), "1" will be substituted into the camera state data CNDT (step S79) to set one-frame winding. Thereafter, the rear cover state flag, camera state data, and damage flag will be written into the EEPROM 14 (step S80). Then, control will return. In addition, if the result is NO at step S77 and step S78, control will return.

Figure 16:
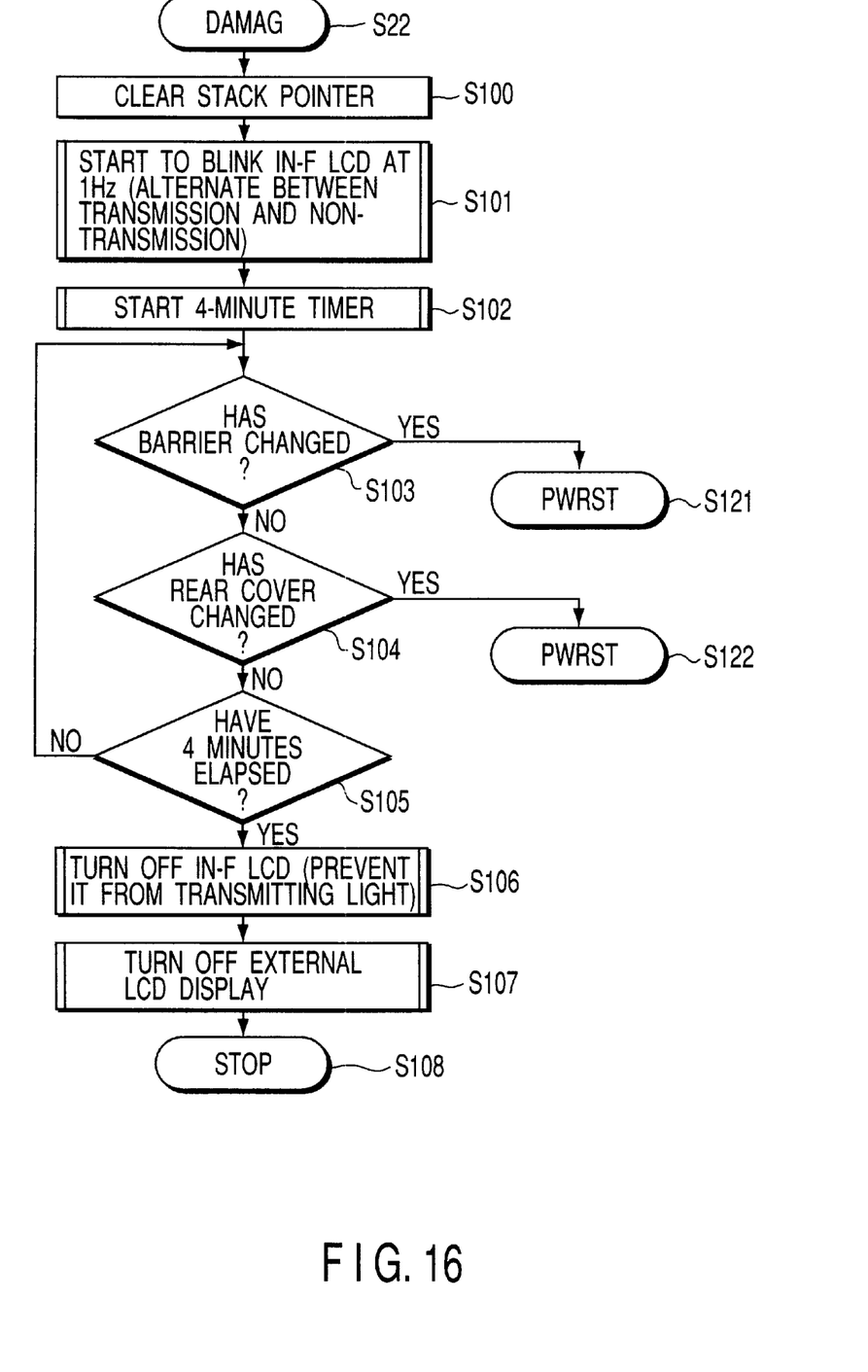
FIG. 16 is a flowchart to help explain the abnormality handling process in detail.

Using the flowchart of FIG. 16, the abnormality handling process will be described in detail. First, the stack pointer is cleared (step S100) and the in-F LCD starts to blink at 1 Hz (in this case, the in-F LCD alternates between transmission and non-transmission) (step S101). Next, after the four-minute timer has been started (step S102), it is judged whether the barrier has changed (step S103). If it has not (NO), it is judged whether the rear cover has changed (step S104). If it has not (NO), it is judged whether four minutes have elapsed (step S105). If they have (YES), the in-F LCD will be turned off to present the no-light-transmitting state (step S106). If they have not (NO), control will return to step S103. Then, control will go to step S107, where the external LCD display will be turned off and the camera operation be stopped (step S108). If YES at step S103 or S104, control will return to "PWRST" at steps S121 and S122.

As described hereinabove, the present invention enables the user to judge properly whether the camera is in the photograph enable mode or in the photograph disable mode, just by looking at the liquid-crystal display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a lens tube;

a liquid-crystal display device which includes a liquid crystal whose transmittance is variable;

a power switch for switching between a photograph enable mode and a photograph disable mode;

a liquid-crystal control section which controls the liquid crystal of the liquid-crystal display device to be in one of a light-transmitting state and a no-light transmitting state; and a lens control section which controls the lens tube so that the lens tube is collapsed when the photograph disable mode is selected by the power switch and after the liquid-crystal control section brings the liquid crystal of the liquid-crystal display device into the no-light-transmitting state.

2. A camera comprising:

a liquid-crystal display device with a liquid crystal whose transmittance is variable; and a liquid-crystal control section which, in a photograph enable mode, brings the liquid crystal of the liquid-crystal display device into a light-transmitting state, and which, in a photograph disable mode, brings the liquid crystal of the liquid-crystal display device into one of a half light-transmitting state and a no-light-transmitting state;

wherein the camera is capable of autoloading and, when the power switch is switched to the photograph enable mode and autoloading is in progress, a release signal is prevented from being accepted, and the liquid-crystal control section brings the liquid crystal from the light-transmitting state to the no-light-transmitting state.

3. A camera comprising:

a liquid-crystal display device which is provided in a finder and includes a liquid crystal which can be set to one of a first, a second, and a third transmittance in descending order of magnitude;

a power switch for switching between a photograph enable mode and a photograph disable mode; and a liquid-crystal control section which, when the photograph enable mode is selected by the power switch, sets the liquid crystal of the liquid-crystal display device to the first transmittance, and, when the photograph disable mode is selected by the power switch, sets the liquid crystal of the liquid-crystal display device to the third transmittance, and, when the photograph enable mode is selected by the power switch and exposure is made, sets the liquid crystal of the liquid-crystal display device to the second transmittance.

4. A camera according to claim 3, wherein the liquid crystal of the liquid-crystal display device comprises a negative macromolecular dispersion liquid crystal.

5. A camera according to claim 3, wherein the camera is capable of autoloading and, when the power switch is switched to the photograph enable mode and autoloading is in progress, a release signal is prevented from being accepted, and the liquid-crystal control section changes the transmittance to one of the second and the third transmittance.

* * * * *